(12) United States Patent
Kim (10) Patent No.: US 6,330,069 B1
(45) Date of Patent: Dec. 11, 2001

(54) POWER SUPPLY CONTROLLING METHOD AND PRINTER ADOPTING THE POWER SUPPLY CONTROLLING METHOD

(75) Inventor: Yong-geun Kim, Suwon (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/123,419

(22) Filed: Jul. 28, 1998

(30) Foreign Application Priority Data

Aug. 27, 1997 (KR) .................................................. 97-41645

(51) Int. Cl.[7] .......................... G03G 15/00; G06F 15/00; G06F 1/26; G06F 1/28; G06F 1/30
(52) U.S. Cl. ............................ 358/1.14; 399/88; 713/323
(58) Field of Search .............................. 358/1.14; 360/69; 399/37, 43, 88, 89; 400/120.08, 120.15; 347/185, 195; 219/216, 490; 713/300, 320, 323, 324

(56) References Cited

U.S. PATENT DOCUMENTS

| | | | |
|---|---|---|---|
| 4,279,012 | * | 7/1981 | Beckedorff et al. .................. 364/104 |
| 4,677,310 | * | 6/1987 | Midorikawa et al. .................. 307/64 |
| 5,542,035 | * | 7/1996 | Kikinis et al. ......................... 395/750 |
| 5,720,560 | * | 2/1998 | Nozawa .................................. 400/54 |
| 5,793,124 | * | 8/1998 | Mitzaki .................................. 307/66 |
| 5,819,013 | * | 10/1998 | Miyazaki et al. .................... 358/1.15 |
| 6,041,382 | * | 3/2000 | Hirano .................................. 710/131 |
| 6,178,299 | * | 8/1999 | Kim ....................................... 399/88 |

\* cited by examiner

Primary Examiner—Kimberly A. Williams
(74) Attorney, Agent, or Firm—Sughrue Mion, PLLC (57) ABSTRACT

A method of controlling power supply and a printer adopting the same. The power supply controlling method includes the steps of obtaining information of on/off operation times of a power supply switch which supplies and interrupts the supply of power from an external power source to a power supply over a predetermined period, storing the information if a power supply off interval exceeds a predetermined off interval, determining the time of supplying and stopping power of the external power source to the power supply for each period based on the stored on/off operation time information, and connecting and separating a power supply line between the external power source and the power supply according to power supply and interruption times determined for each period. Also, the printer includes a power supply on/off operation information obtaining device generating on and off operation information of the power supply switch, and a power supply control module connecting or separating a power supply line of the external power source to the power supply according to power supply on and off operation time determined by an internal power supply on and off determining program of the power supply on and off operation information. Accordingly, power supply and interruption required for driving the printer can be automatically performed at set times without operation by a user, to thereby automatically reduce waste of power.

13 Claims, 6 Drawing Sheets

POWER SUPPLY CONTROLLING METHOD AND PRINTER ADOPTING THE POWER SUPPLY CONTROLLING METHOD

BACKGROUND OF THE INVENTION

1. Field of the Invention

The present invention relates to a method of controlling a power supply and a printer adopting the same. More particularly, this invention is directed to a power supply controlling method for controlling the supply and interruption of power of an external power source to and from the power supply which generates power required to drive a printer.

2. Description of the Related Art

Figure 1:
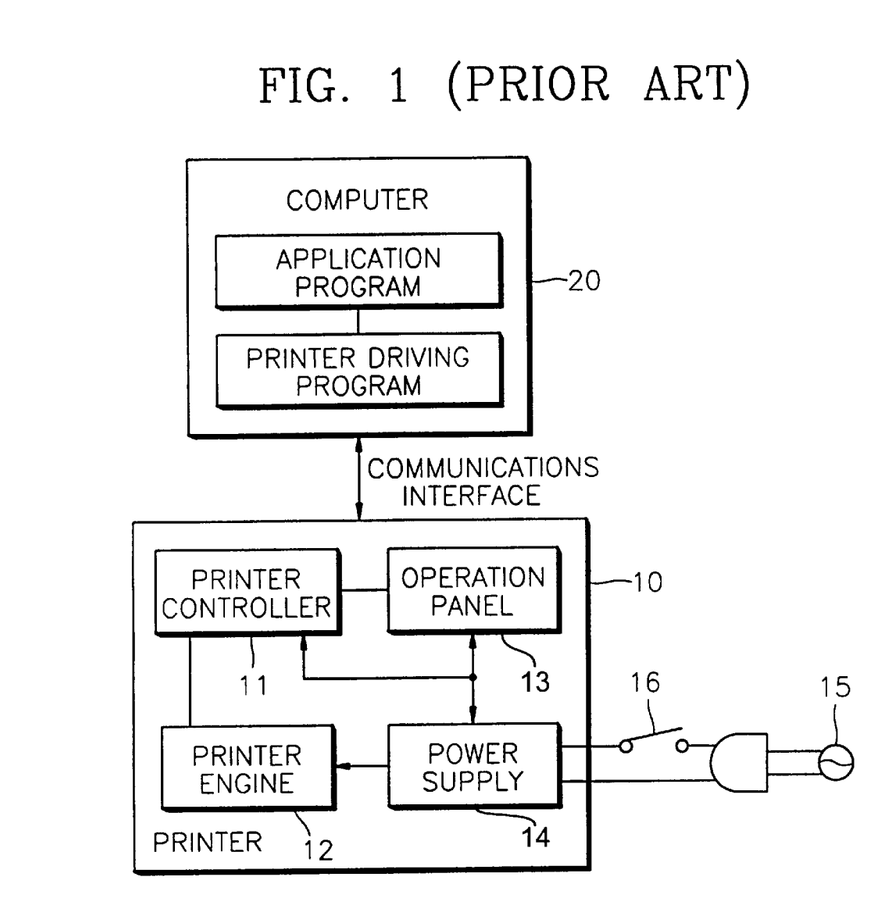
FIG. 1 is a block diagram of a conventional printer connected to a computer.

Referring to FIG. 1, a conventional printer 10 receives print data from a computer 20 via a communications interface.

The printer 10 includes a printer controller 11 for processing the print data and controlling the entire system, an operation panel 13 having an operation key for outputting an operation signal to the printer controller 11, a printer engine 12 controlled by the printer controller 11 to perform practical printing on a paper sheet and a power supply 14 for receiving power from an external power source 15 to supply power to elements including the printer engine 12.

In the printer 10 in which an ink is employed as a developer, the printer engine 12 includes a driving means for driving a circulating photosensitive belt, a laser scanning unit for irradiating light beams onto the photosensitive belt to form an electrostatic latent image, a developing apparatus for developing the electrostatic latent image, a transferring apparatus for transferring the image developed on the photosensitive belt to a paper sheet, and a resetting apparatus for removing the electrostatic latent image formed on the photosensitive belt and for electrically resetting the photosensitive belt so that a new electrostatic latent image can be formed.

In the printer engine 12, some apparatuses which need to be maintained at a constant temperature, e.g., a heating pressure roller of the transferring apparatus for fixing a toner image to the paper sheet, must receive power continuously to maintain the constant temperature.

However, if the printer is not used for long periods of time (while in a power-on state), the ongoing power supplied to the printer is wasted. Therefore, most printers employ a warm-up mode, which is one of several power supply modes which reduce power consumption when the printer is idle. In the warm-up mode, power which is appropriately lowered below the value required for printing, is supplied to the print engine 12 to maintain required temperatures.

However, the warming-up mode having the lowered power still consumes approximately 10 watts of power. Thus, if the printer in a power-on state is not used for a long time, or if the power supply is not cut off due to carelessness of the user, much power is wasted.

Also, after executing a power supply switch to first supply power to the conventional printer 10, the temperature of a thermal element must be increased, such as the heat pressure roller, up to a predetermined temperature so that a printable state is attained. Thus, a long period of waiting time is required for printing after initially switching the printer on.

SUMMARY OF THE INVENTION

To solve the above problem, an object of the present invention is to provide a power supply controlling method capable of automatically supplying or cutting off external power to a printer according to stored power supply on/off times, which have been set to suppress the waste of power, and a printer adopting the same.

Accordingly, to achieve the above objective, a power supply controlling method includes the steps of: (a) obtaining information of on and off operation times of a power supply switch capable of continuing and interrupting the supply of power of an external power source to a power supply for a predetermined period; (b) storing the information of on and off operation times if a power supply off interval from the off time of the power supply switch to on time thereof exceeds a predetermined off interval; (c) determining the time of supplying and stopping power of the external power source to the power supply for each period based on the stored on and off operation time information; and (d) connecting and separating a power supply line between the external power source and the power supplier according to the time of supplying and interrupting the power determined for each period.

In addition, to accomplish the above objective, a printer includes a printer controller for receiving print data to transform the received data into driving data and controlling the entire system. A printer engine driven according to the driving data and an operation panel outputs an operation signal of a user to the printer controller. Also, a power supply transforms the power received from an external power source to supply power required for driving the printer, and a power supply switch connects and separates a power supply line between the external power source and the power supply. The system also comprises power supply on/off operation information obtaining means for generating power supply on and off operation information according to on/off operations of the power supply switch. A power supply control module determines the time of supply and interrupting power of the external power source to and from the power supply for a predetermined period obtained by an internal power supply on and off determining program according to the power supply on and off operation information, and controls the supply and interruption of power of the external power source to and from the power supply according to the determined power supply and interrupt times.

The power operation information obtaining means may generate power supply operation information according to on/off operations of the power supply switch, or use a voltage signal supplied from an output terminal of the power supplier. Also, the printer controller, functioning as the power supply on and off operation information obtaining means, determines rising and falling levels of a voltage supplied by the power supply to generate the power supply on/off operation information, and supplying the generated power supply on/off operation information to the power supply control module.

Preferably, the power supply control module receives required power from a separate battery, and includes an additional power supply switch installed on the power supply line in series with the power supply switch and a switch operator controlling the switching on/off of the additional power supply switch.

BRIEF DESCRIPTION OF THE DRAWINGS

The above objectives and advantages of the present invention will become more apparent by describing in detail a preferred embodiment thereof with reference to the attached drawings in which.

DESCRIPTION OF THE PREFERRED EMBODIMENTS

Figure 2:
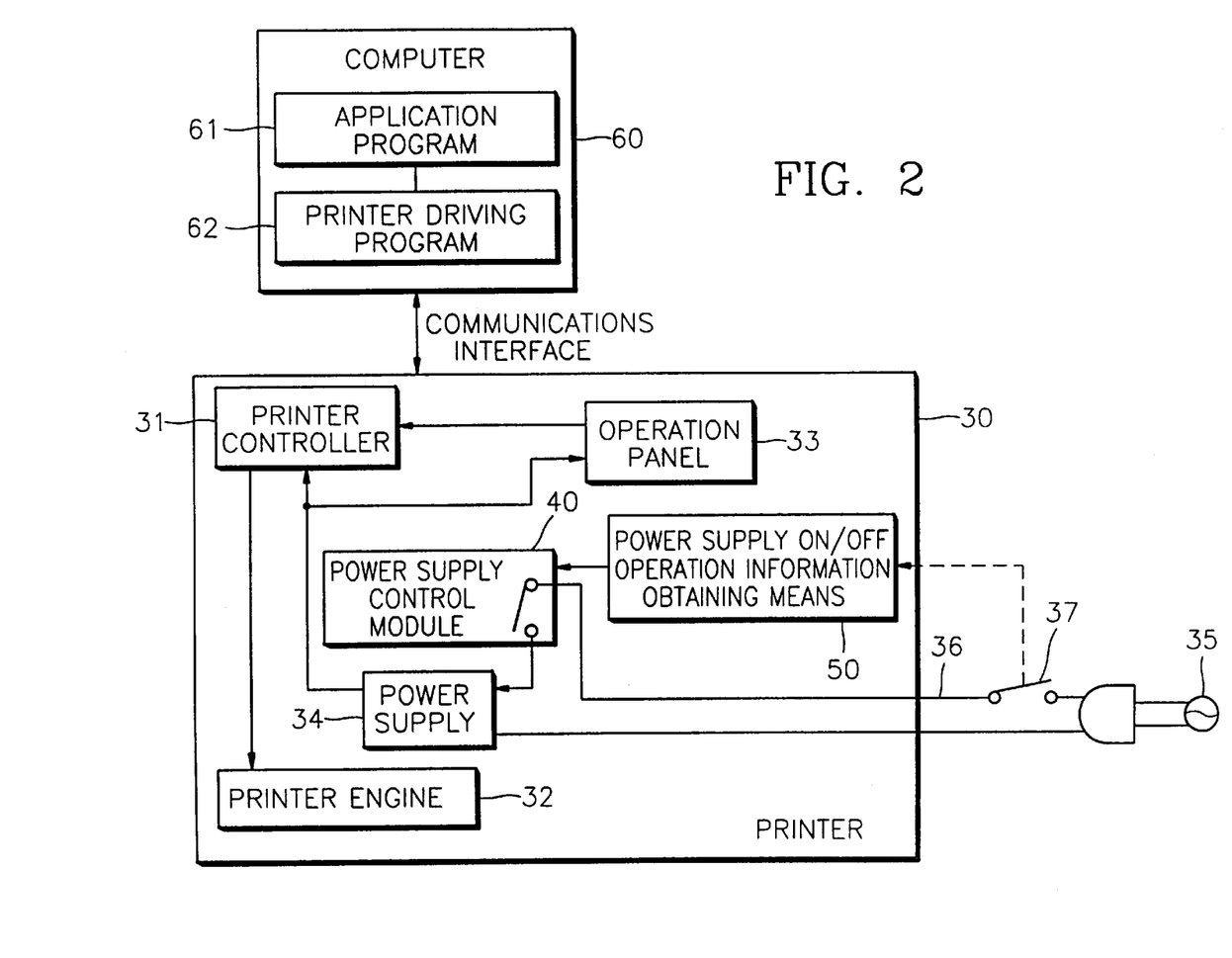
FIG. 2 is a block diagram of a printer according to the present invention connected to a computer.

Referring to FIG. 2, a printer 30 includes a printer controller 31, an operation panel 33, a printer engine 32, a power supply 34, a power supply control module 40 and a power supply on/off operation information obtaining means 50.

The printer controller 31 for controlling the entire system converts print data input from an external apparatus, such as a computer 60, to driving data appropriate for driving of the printer engine 32 to output the converted data to the printer engine 32, and processes commands input from the operation panel 33.

The print data output which is output from the computer 60 through a communications interface contains data having documents or graphic images which have been generated from an applied program and changed to language for the printer by the printer driving program 62.

Various operation keys capable of selecting various functions of a printer are provided on the operation panel 33 outside the main body of the printer. The operation panel 33 outputs an operation signal generated by executing an operation key to the printer controller 31. Preferably, a select key (not shown) for selecting automatic power supply control by the power supply control module 40 is provided on the operation panel 33.

The printer engine 32 is controlled by the printer controller 31 and serves as a practical image printing device. In a laser color printer, the printer engine 32 includes a plurality of laser scanning units for scanning light beams on a circulated photosensitive belt to form an electrostatic latent image, a plurality of developing apparatuses for developing the electrostatic latent image for each color, a transferring apparatus for transferring the image formed on the photosensitive belt to a sheet of paper, and a resetting apparatus for removing the electrostatic latent image formed on the photosensitive belt and electrically resetting the photosensitive belt so that a new electrostatic latent image can be formed.

The power supply 34 receives power from an external power source 35, e.g., a common AC power supply, to generate a voltage required for elements of the printer including the printer engine 32, and to supply power to the elements through an output terminal thereof.

The power supply on/off operation information obtaining means 50 generates on and off operation information of the power supply switch 37 by user command and outputs the generated information to the power supply control module 40. The power supply on/off operation information obtaining means 50 is directly interrupted by operation of the power supply switch 37 to generate the power supply on and off operation information. The voltage signal output from an output terminal of the power supply 34 may be supplied to the power supply control module 40 as on/off operation information of the power supply switch 37 (see FIG. 3). At this time, the power supply control module 40 obtains the power supply on and off operation information by monitoring the rising and falling of the voltage supplied from the power supply 34.

Also, the printer controller 31, instead of the power supply on/off operation information obtaining means 50, may monitor the rising and falling levels of the voltage supplied from the power supply 34 to generate the power supply on and off operation information, and supply the information to the power supply control module 40.

If automatic power supply on and off control is required, the power supply control module 40 turns the power supply line 36 on or off between the external power source 35 and the power supply 34 based on the power supply and interruption times of a power supply which is internally determined per a predetermined period.

The time of supplying and interrupting power of the power supply control module 40 is determined by a power supply on/off determining program based on the on/off operation times of the power supply switch 37 supplied from the power supply on/off operation information obtaining means 50 for a predetermined interval. The time of supplying and interrupting power of the power supply control module 40 may be set using an input apparatus, i.e., the operation panel 33 or the computer 60. A printer 30 may be constructed such that the time of supplying or interrupting the power can be determined by using the operation panel 33 or a connected computer 60 or by the time obtained by an internal determining program based on a power supply switch 37 operation pattern.

The method of determining the time of supplying and interrupting the power according to a power supply on and off control determining program inside the power supply control module 40 will be described in a power on and off control method to be described.

Figure 3:
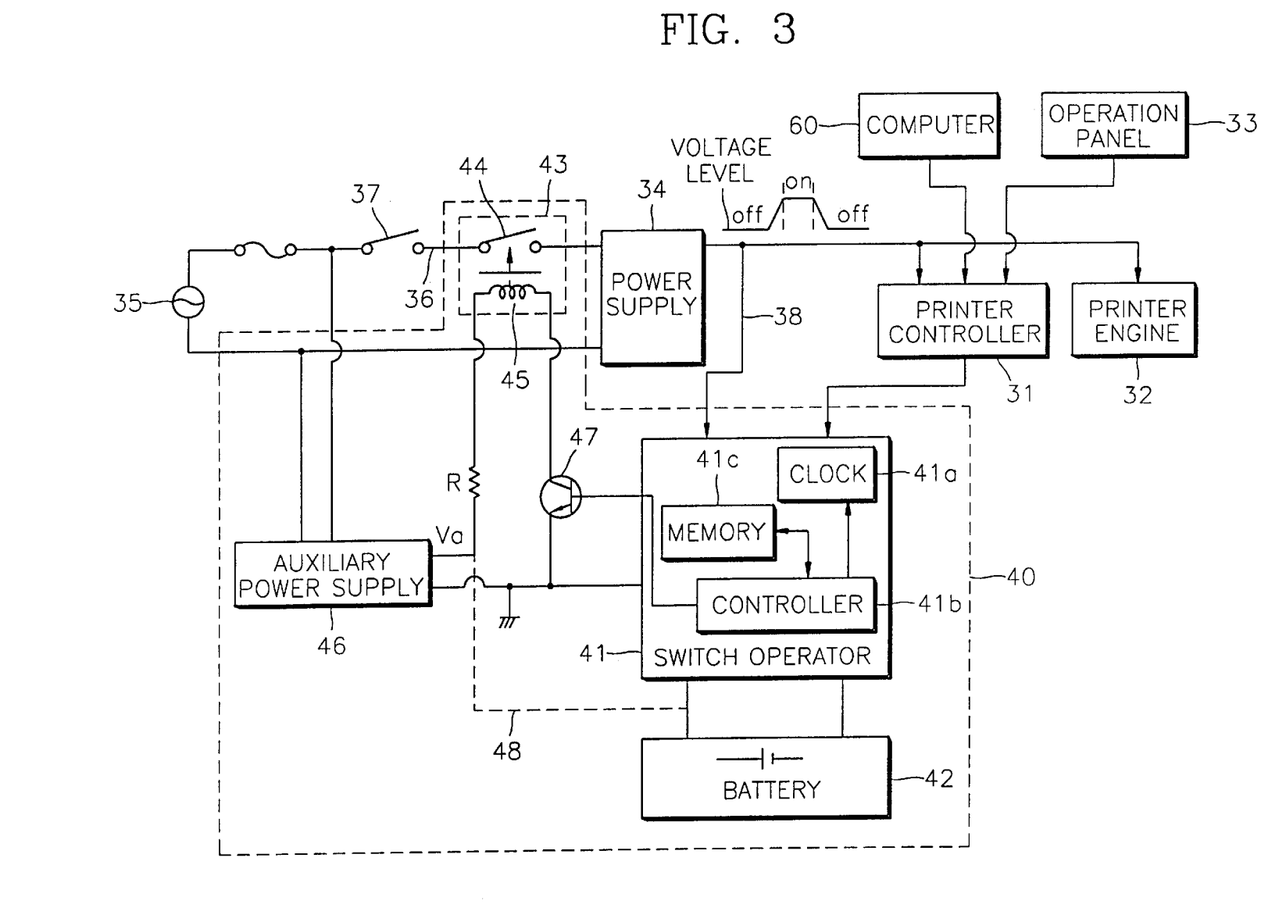
FIG. 3 is a circuit diagram of a power supply controlling module of the printer of FIG. 2.

The circuit diagram of the power supply control module 40 according to a preferred embodiment is shown in FIG. 3. The same elements are assigned the same reference numerals.

Referring to FIG. 3, the power supply control module 40 includes a switch operator 41 and an additional power supply switch 43.

The output terminal of the power supply 34 and a switch operator 41 are connected to each other such that the voltage signal output through the output terminal 38 of the power supply 34 as power supply on/off operation information is output to the switch operator 41 of the power supply control module 40. Thus, if the voltage signal rises to a predetermined level or higher, the switch operator 41 determines the power supply as on, and if the voltage signal falls to a predetermined level or below, the power supply is determined as off.

The power supply control module 40 is controlled by the printer controller 31 communicating with the operation panel 33 or the computer 60.

An additional power supply switch 43 is a relay switch capable of connecting or disconnecting the power supply line 36 and is serially connected to the power supply switch 37.

The additional power supply switch 43 includes a switch member 44 which is switched on and off according to a change in the magnetic force and a coil unit 45 causing the magnetic force change.

The switch operator 41 includes a memory 41c for storing a program required for operation of the controller 41b and information of power on/off times, a clock 41a for supplying information of current time and a controller 41b for controlling the switching on and off of the additional switch 43 according to the determined power supply on and off times.

The switch operator 41 controls a switch device 47, such that a current path of an auxiliary power supply 46 for receiving power from the external power source 35 to generate a DC voltage of a predetermined level to the coil unit 45 via a resistor R for limiting current, can be closed and opened. Thus, if a high signal turning on the switch device 47 is output from the switch operator 41, current flows through the coil unit 45, and thus the switch member 44 is switched on according to the magnetic force. If a low signal is output from the switch operator 41, the switch member 44 is switched off. Also, the switch member 44 may be constructed to be switched off when the current flows in the coil unit 45.

Meanwhile, a battery 42 which is a driving source of the switch operator 41, without an auxiliary power supply 46 for supplying current to the coil unit 45, may be connected to the coil unit 45 through a connection line 48 indicated by dotted lines to be a current supply source of the coil unit 45.

Hereinafter, a method of controlling the on/off function of a power supply according to the present invention will be described with reference to FIGS. 3 through 6.

A user command determines the power supply switch 37 on/off operation times for a predetermined period, for example 24 hours, a week or more. As shown in FIG. 3, a power supply level output from the output terminal 38 of the power supply 34 obtains the information of the power supply switch 37 on and off operation times.

Then, the power supply on/off times corresponding to the case in which the power supply off interval from the power supply off time to the power supply on time exceeds a predetermined off interval (window time) is selected from the information of power supply on and off operation times. The process of selecting the power supply on and off times will be described with reference to FIG. 4 in detail as follows. If a voltage level of the output terminal of the power supply 34 is more than a predetermined level, i.e., the power supply is on (step 100), a gap corresponding to a difference between the current time and the previously stored power supply off time is calculated (step 200). If the gap is equal to or greater than the window time w corresponding to the set off interval, the on time is stored in order to be used as the power supply on control time (step 400). However, if the gap is less, the on time is not stored and the previously stored power supply off time is also deleted (step 500). If the interval from supply to stop of power is less than the minimum time required to warm up the printer engine 32 to be in a print stand by state, more power is wasted. Thus, preferably, the window time is determined by a time beyond the warm up time and appropriate for system operation. The window time may be set at zero in order to obtain all power supply on/off operation time information without selection.

Figure 4:
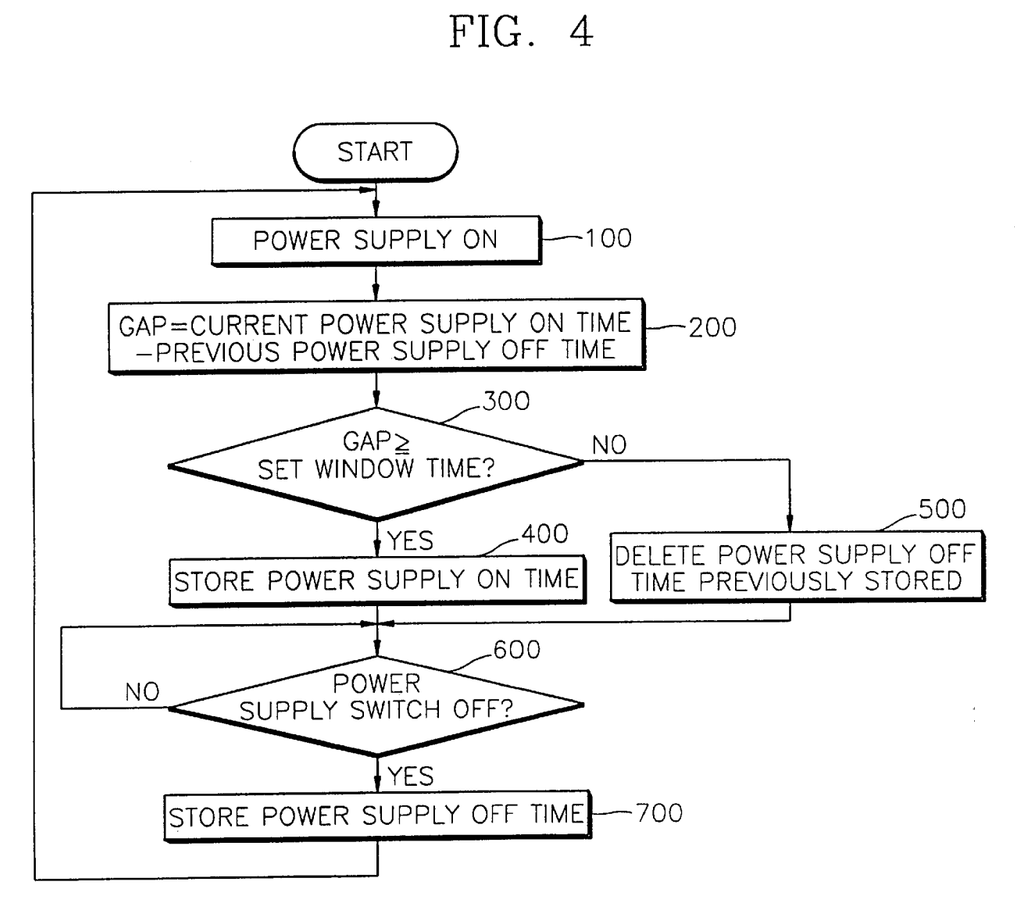
FIG. 4 is a flowchart of a process of determining on and off times of the power supply controlling module of FIG. 3.

In the step 600, if the power supply switch 37 is turned off, the current power supply off time is stored (step 700). The process is repeatedly performed for the predetermined period.

The time of supply and interrupting power of the external power source to and from the power supply 34 for a predetermined period is determined by an internal determining program using the data of power supply on/off times stored through the above selection process, e.g., 24 hours or more. In the determining program, the power supply on/off times selected and stored for a set period is determined as the power supply and interruption time, or by the mean of time data obtained for several periods or by other arithmetic methods.

Figure 5:
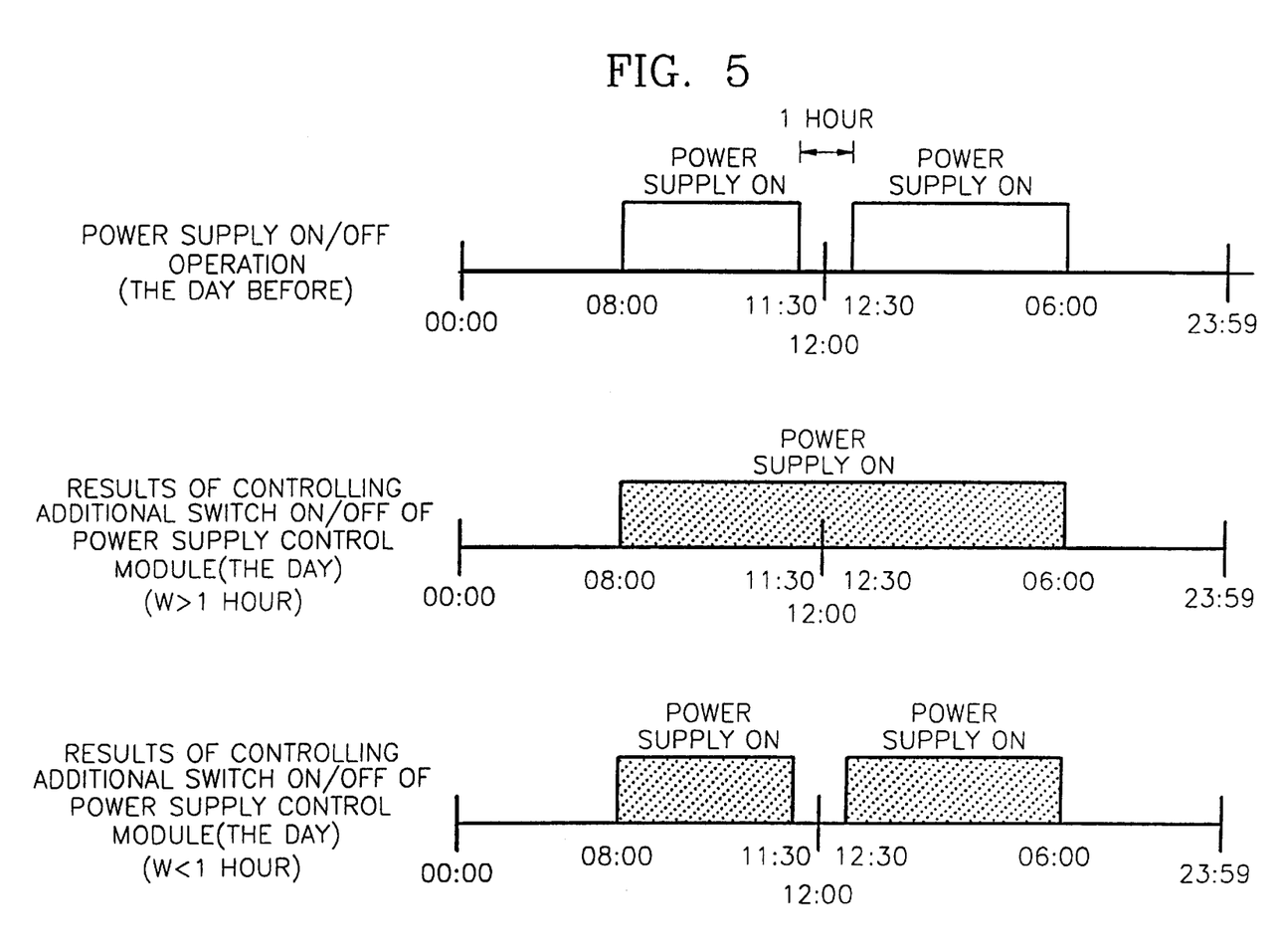
FIG. 5 shows results of on and off control of the power supply according to the process of determining on and off times of FIG. 4.

The case in which the power supply on and off time stored for one predetermined period is set as the power supply and interruption time by a determining program is shown in FIG. 5. In FIG. 5, one day is set as a period to obtain the power supply switch on and off operation information, and in the next period, the power supply switch is turned on and automatic on and off control of the additional switch 43 by the power supply off period corresponding to a period of a total of one hour before and after 12 o'clock (i.e., 11:30–12:30) according to the operation of the power supply switch 37, in the previous day which is the period of obtaining power supply switch on and off operation information. At this time, if the power supply switch on and off operation time information is set so that the window time W corresponding to the power supply off interval exceeds 1 hour is only selected and obtained, the power on state is controlled to be maintained even before and after 12 o'clock in the process of automatic control according to the power supply control module 40.

If only the power supply switch on and off operation time information having the window time W with respect to the power supply switch off interval of more than 1 hour is set to be selected in the process of obtaining power supply on and off operation information, the power supply off time information corresponding to a total of one hour before and after 12 o'clock is stored. In the process of automatic control according to the power supply control module 40, the additional power supply switch 43 is controlled to be opened at the stored time, i.e., at 11:30, and to be closed at 12:30.

The above period of a power supply switch 37 operation pattern obtaining interval is appropriately selected in units of 24 hours, a week or a month, and data of the required power supply switch on and off operation information is selected and stored during one selected period or several periods.

Figure 6:
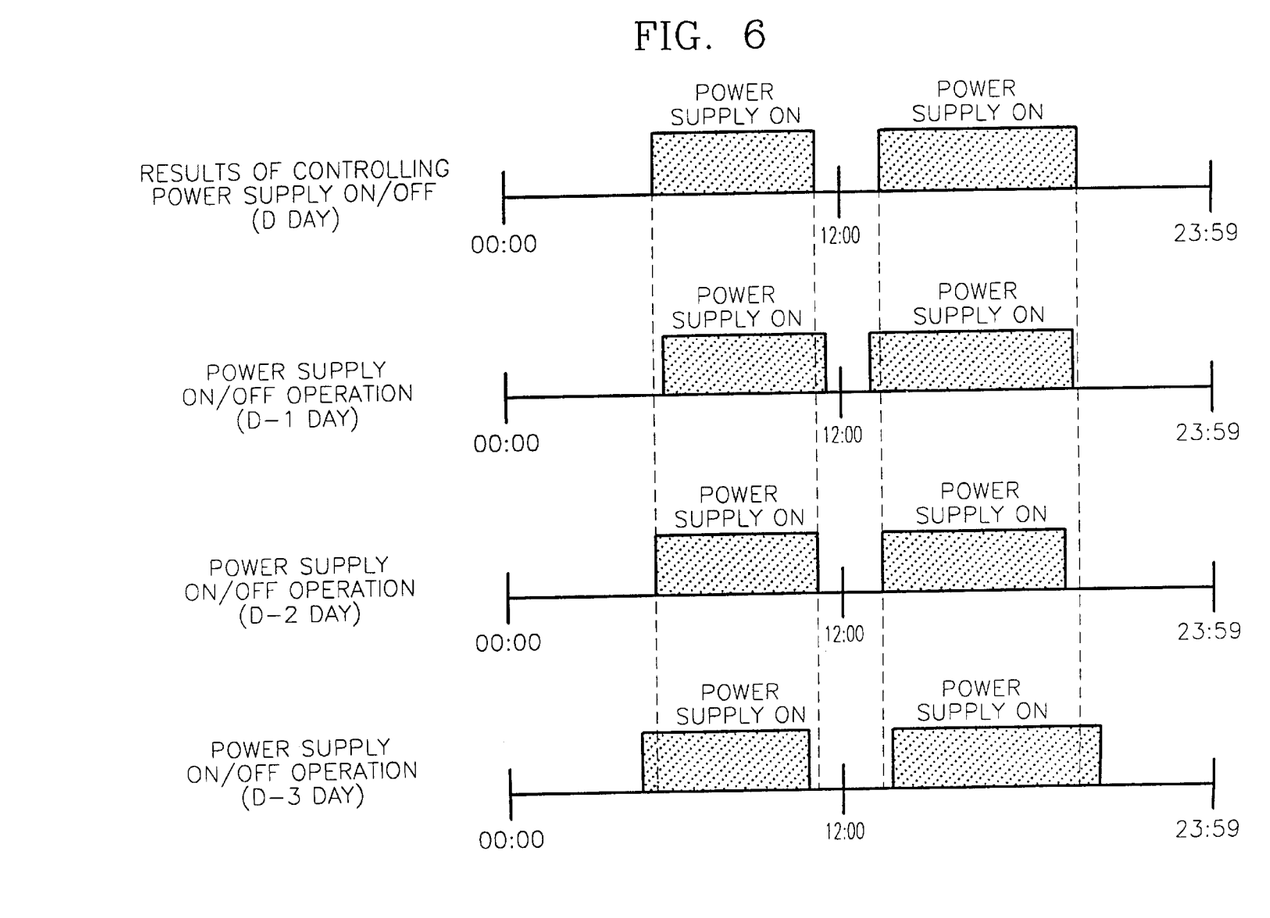
FIG. 6 shows another example of a method for determining on and off times, in which automatic control results are illustrated using on and off operation times determined according to arithmetical means for power supply switch operation times for three days.

In FIG. 6, if the window time for selecting data is determined as zero, data obtained from all information of the power supply on and off operation time for three days is analyzed to determine the power supply on and off times. In other words, the mean of each temporal band is obtained from the data of the power supply on and off time for three days, and the time corresponding to the mean is determined as the power supply on/off control times.

The time decision can be determined by selecting an appropriate calculation method such as arithmetic mean, maximum off interval or a minimum off interval.

If automatic power supply on/off control is required, the power supply line 36 between the external power source 35 and the power supply 34 is automatically connected and separated according to internally determined and stored supply and interruption times. In other words, in a state in which the power supply switch 37 is switched on, switching the additional power supply switch 43 on and off is automatically controlled according to the internally determined and stored power supply on and off control times.

As described above, according to the method of controlling the switching on and off of the power supply and the printer adopting the same, the supply of power required to automatically operate the printer according to the supply and interruption times internally determined is realized through the process of obtaining the information of a power supply switch operation pattern, to thereby reduce waste of power.

This invention has been described above with reference to the aforementioned embodiments. It is evident, however, that many alternatives, modifications and variations will be apparent to those skilled in the art in light of the foregoing description. Accordingly, it is intended to embrace all such alternatives, modifications and variations as fall within the spirit and scope of the appended claims.

What is claimed is:

1. A method of automatically controlling an on/off function of a power supply, comprising the steps of:
   (a) obtaining information of on and off operation times of a power supply switch capable of continuing and interrupting a supply of power from an external power source to the power supply for a predetermined period;
   (b) storing the information of on and off operation times if a power supply off interval between the off operation time of the power supply switch to on operation time thereof exceeds a predetermined off interval;
   (c) determining a time for supplying and stopping power of the external power source to the power supply for each predetermined period based on the stored on and off operation time information; and
   (d) connecting and separating a power supply line between the external power source and the power supply according to the time of supplying and interrupting the power determined for each predetermined period.

2. The method of claim 1, wherein the predetermined period is 24 hours.

3. The method of claim 1, wherein the predetermined period is a week.

4. A printer including a printer controller for receiving print data to transform the received data to driving data and for controlling a printer system, a printer engine driven according to the driving data, an operation panel outputting an operation signal of a user to the printer controller, a power supply transforming the power received from an external power source to supply power required for driving the printer, and a power supply switch connecting and separating a power supply line between the external power source and the power supply, comprising:
   power supply on/off operation information obtaining means generating power supply on and off operation information according to on and off operations of the power supply switch; and
   a power supply control module determining times of power supply and interruption of the external power source to and from the power supply over a predetermined period, obtained by an internal power supply on/off determining program according to the power supply on and off operation information, and controlling the power supply and interruption of the external power source to and from the power supply according to the determined power supply and interruption times.

5. The printer of claim 4, wherein the power supply on/off determining program determines the on and off operation time information, corresponding to when a power supply off interval between the power supply switch off time and the on time exceeds a predetermined off interval, as the power supply and interruption times.

6. The printer of claim 4, wherein the power supply on/off operation information obtaining means supplies a voltage signal output from an output terminal of the power supply as the power supply on and off operation information to the power supply control module.

7. The printer of claim 4, wherein the printer controller functions as the power supply on/off operation information obtaining means and determines rising and falling levels of a voltage supplied by the power supply to generate the power supply on and off operation information, and supplies the generated power supply on and off operation information to the power supply control module.

8. The printer of claim 4, wherein the power supply control module receives required power from a separate battery.

9. The printer of claim 4, wherein the power supply control module comprises:
   an additional power supply switch installed on the power supply line in series with the power supply switch; and
   a switch operator controlling the switching on and off of the additional power supply switch.

10. The printer of claim 9, wherein the additional power supply switch comprises:
    a switch member performing on and off operation according to a change in a magnetic force; and
    a coil unit for changing the magnetic force to maintain and interrupt current according to control of the switch operator.

11. The printer of claim 10, further comprising an auxiliary power supply for receiving power of the external power source to generate power required to drive the coil unit, wherein a first end of the coil unit is connected to an output terminal of the auxiliary power supply, and a second end thereof is connected to a switch device switched on and off by the switch operator to maintain and interrupt current of the auxiliary power supply to the coil unit.

12. The printer of claim 10, wherein a first end of the coil unit is connected to one end of the battery, and a second end of the coil unit is connected to a switch device capable of maintaining and interrupting a current path from one end of the battery to the other end of the battery via the coil unit, switched on and off by the switch operator.

13. The printer of claim 4, wherein a clock supplying current time information is installed in the power supply control module.

* * * * *